United States Patent [19] [11] 4,099,335
Jezl et al. [45] Jul. 11, 1978

[54] DRYING AND FINISHING OPERATIONS IN SLURRY OR BULK PHASE POLYMERIZATION PROCESSES

[75] Inventors: James L. Jezl, St. Charles; Edwin F. Peters, Winfield, both of Ill.

[73] Assignee: Standard Oil Company (Indiana), Chicago, Ill.

[21] Appl. No.: 743,095

[22] Filed: Nov. 19, 1976

[51] Int. Cl.² .............................................. F26B 3/00
[52] U.S. Cl. .............................................. 34/9; 34/12
[58] Field of Search .......................... 34/9, 12; 526/65

[56] References Cited

U.S. PATENT DOCUMENTS

| 3,631,605 | 1/1972 | Wylie et al. | 34/9 |
| 3,927,983 | 12/1975 | Gordon et al. | 23/260 |
| 3,957,448 | 5/1976 | Shepard et al. | 526/65 |
| 3,965,083 | 6/1976 | Jezl et al. | 526/65 |

*Primary Examiner*—John J. Camby
*Attorney, Agent, or Firm*—Stanley L. Hensley; Arthur G. Gilkes; William T. McClain

[57] ABSTRACT

A process for drying polymer slurry produced in slurry or bulk phase polymerization comprising removing, in a gas stream which contains polymerizable monomer, easily vaporizable liquid components from a stirred drying zone containing a large, in comparison with the volume of slurry from said polymerization added to said zone, amount of solid polymer particulate to form substantially dry polymer particulate using in essential part polymerization heat generated in said zone by carrying out therein a fraction of the overall amount of polymerization. The resulting polymer can be finished conventionally or by transferring said particulate to a melting zone in which an easily transferable polymer melt is formed, said melting accomplished in substantial part using polymerization heat generated in said melting zone by a fraction of the overall amount of polymerization.

17 Claims, 1 Drawing Figure

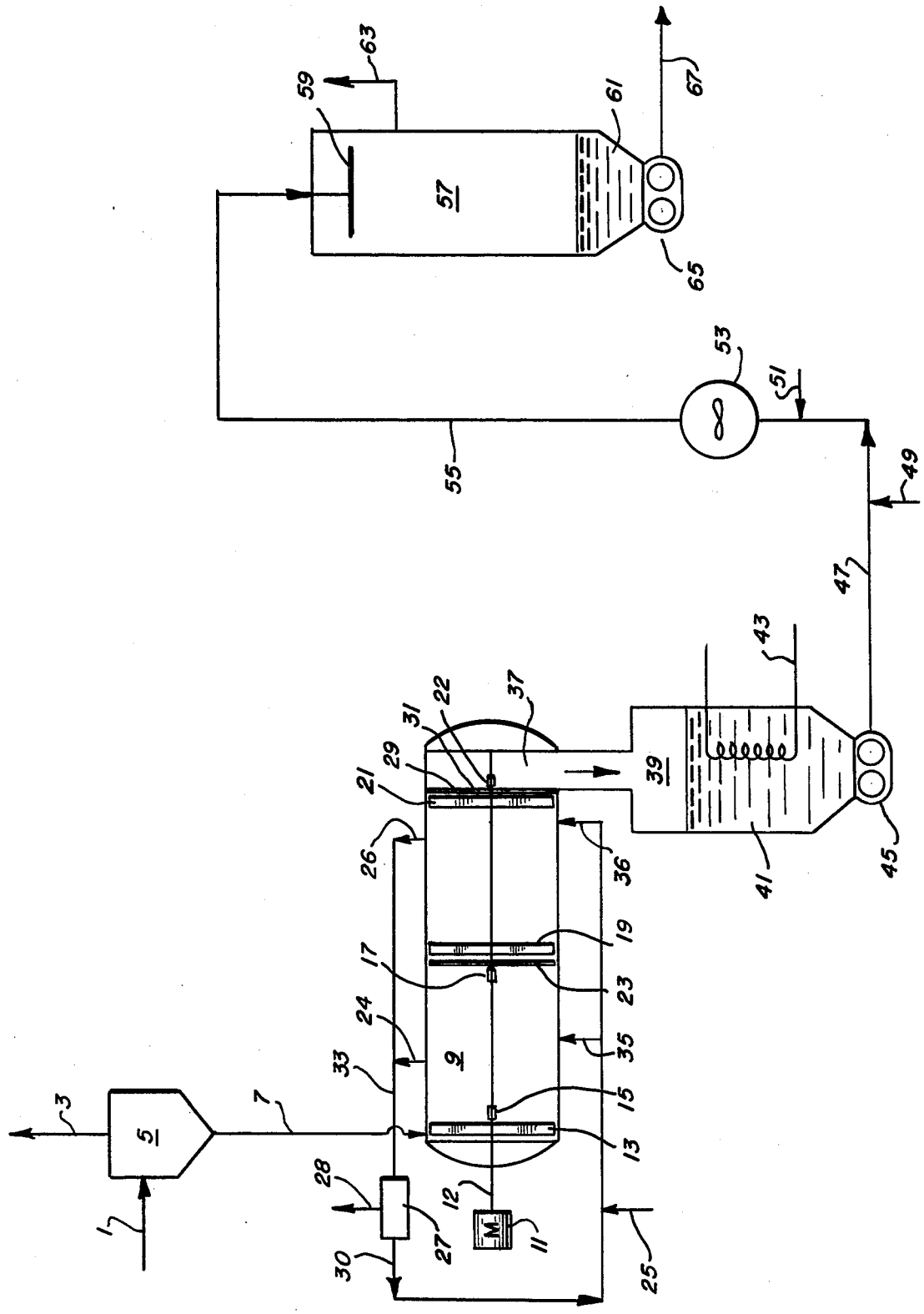

DRYING AND FINISHING OPERATIONS IN SLURRY OR BULK PHASE POLYMERIZATION PROCESSES

SUMMARY OF THE INVENTION

Processes are described herein for drying polymer slurry produced in slurry or bulk phase polymerization comprising removing, in a gas stream which contains polymerizable monomer, easily vaporizable liquid components from a stirred drying zone, containing a large, in comparison with the volume of said slurry added to said zone, amount of solid polymer particulate to form substantially dry polymer particulate, said drying accomplished in essential part using polymerization heat generated in said zone by carrying out therein a fraction of the overall amount of polymerization employing catalyst and at least in part monomer associated with said slurry and, more particularly, processes are described herein for treating polymer slurry produced in slurry or bulk phase polymerization comprising removing, in a gas stream which contains polymerizable monomer, easily vaporizable liquid components from a stirred drying zone containing a large, in comparison with the volume of said slurry added to said zone, amount of solid polymer particulate to form substantially dry polymer particulate and leading said dry particulate to a melting zone wherein said particulate is melted to form an easily transferable melt, both drying in essential part and melting in substantially part accomplished using polymerization heat generated in said zones by carrying out therein a fraction of the overall amount of polymerization employing catalyst and at least in part monomer associated with said slurry.

In accordance with the instant invention, continuous processes are described herein for treating polymer slurry produced in slurry or bulk phase polymerization comprising removing, in a gas stream which contains polymerizable monomer, easily vaporizable liquid components from a stirred drying zone comprising (a) a horizontal reactor-dryer of substantially circular cross-section containing a centrally-located drive shaft extending longitudinally through said reactor to which are attached a plurality of adjacently located paddles, which paddles cause essentially no forward or backward movement of the particulate matter contained in said reactor-dryer and extend transversely within and to a short distance from the internal surfaces of said reactor-dryer, said reactor-dryer having one or more polymerization-drying sections divided by the necessary number of barriers so constructed to allow free gas mixing in said reactor-dryer and to control movement of said particulate matter between said sections;
(b) driving means for said drive shaft;
(c) one or more off-gas outlets spaced along the topward part of said reactor-dryer;
(d) one or more vapor recycle inlets spaced along the bottomward part of said reactor-dryer; and
(e) take-off means for said particulate matter at one end of said reactor-dryer, said zone containing a large, in comparison with the volume of said slurry added to said zone, amount of solid polymer particulate to form substantially dry polymer particulate and leading said dry particulate to a melting zone wherein said particulate is melted to form an easily transferable melt, said drying in essential part and said melting in substantial part accomplished using polymerization heat generated in said zones by carrying out therein a fraction of the overall amount of polymerization employing catalyst and at least in part monomer associated with said slurry.

BACKGROUND OF THE INVENTION

In slurry or bulk phase polymerization processes the effluent slurry from the reactor is normally freed of solvent or liquid monomer, the catalyst killed, the product purified and recovered as a powder which is then extruded and chopped into pellets. This is an expensive process having a large vent loss of monomers which must be purified for reuse and the solvent in slurry polymerization must be purified to remove catalyst deactivants, etc. Further, the process is energy intensive in that large extruders are normally employed. Vapor phase polymerization can be less expensive and, recently, important improvements in the economics of vapor phase polymerization of monomers have been claimed for new processes taught in U.S. Pat. No. 3,970,611 and U.S. Pat. Appl. No. 642,583, filed Dec. 12, 1975.

Now a way has been found to utilize many of such improvements in slurry polymerization to form processes in which polymerization is continued after the slurry is removed from the reactor so that the heat of further polymerization can be used to dry the particulate and, optionally, convert it to a transferable melt which can be handled as a viscous liquid instead of as a powder so that expensive extrusion equipment is not needed; moreover, the flashed polymerization medium can be recondensed and recycled without extensive purification.

SHORT DESCRIPTION OF THE DRAWING

The FIGURE shows one embodiment of the processes described herein in which polymerization reactor slurry is concentrated prior to further treatment and polymer particulate after drying is melt finished.

STATEMENT OF THE INVENTION

With reference to the FIGURE the inventive process comprises introduction of polymer slurry from a slurry or bulk phase polymerization process, for example from a slurry loop reactor, through line 1 to separator 5. Separator 5 is a device for partially removing easily vaporizable, liquid components from the slurry and can be for example a hydroclone, a centrifuge or another device of a similar nature. Some of the slurry medium is removed in separator 5 and passes generally as a liquid through line 3 and thereafter is recycled to the reactor without additional treatment. The concentration step is preferred, but optional, and slurry from the reactor can be led directly into reactor-dryer 9. In such case reactor-dryer 9 will be of larger size for a given polymer throughput, will require a larger rate of gas recycle, and do a larger fraction of the overall amount of polymerization. The concentrated slurry is passed from separator 5 through line 7 into reactor-dryer 9.

Reactor-dryer 9 is a horizontal, preferably carbon steel, cylindrical device having centrally-located drive shaft 12 passing longitudinally through the major portion of its length and driven by motor 11. A plurality of adjacently attached two paddle impellors represented in part by 13, 15, 17, 19, 21 and 22 are secured to drive shaft 12. Their number is sufficient for adequate heat transfer without bed fluidization of the particulate contained in reactor-dryer 9. Each paddle extends radially outward from drive shaft 12 and has a small clearance with the inner surface of reactor-dryer 9. Barrier (baffle) 23 which is attached to drive shaft 12 divides reactor-dryer 9 into two polymerization-drying sections and is a thin metal disk filling about three-fourths of the cross-sectional area of reactor-dryer 9. Line 33 removes off-gases through outlets 24 and 26 from reactor-dryer 9 and leads them to separation zone 27 wherein condensable components are removed through line 28, which components can be recycled directly to the polymerization reactor. The gaseous components of said off-gases are removed from separation zone 27 through line 30 and returned to reactor-dryer 9 via recycle inlets 35 and 36. Make-up monomer or monomers and optionally hydrogen are added through line 25.

As particulate contained in reactor 9 moves towards take-off zone 37 essentially by overflow, it is gradually dried by evaporation using heat of polymerization from polymerization taking place in reactor-dryer 9. Substantially dried polymer particulate is taken off via impellor 21, aperture 29 in barrier (baffle) 31 and impellor 22 at a rate dependent upon the rate of slurry introduction. Dried particulate then falls through take-off zone 37 into melter 39 in which a polymer particulate phase sits on top of molten polymer phase 41. A further amount of polymerization takes place in melter 39 which, together with a variable (depending upon the monomer being polymerized etc.) amount of heat supplied by heater 43, melts the particulate forming an easily transferable polymer melt that is pumped from melter 39 by polymer gear pump 45.

The melt is pumped through line 47 where it can be treated with a catalyst kill agent entering through line 49 and additives (stabilizers, colorants, etc.) can be added through line 51. Alternatively, additives can be added partially or wholly into melter 39. The polymer melt is passed through mixer 53 to disperse kill agent etc. and through line 55 to stranding die 59 placed in the top of devolatilizer 57. Volatile components removed from the molten polymer in devolatilizer 57 are removed through line 63 either by vacuum or by employing a sweep of inert gas entering through another line (not shown) which can be suitably connected to devolatilizer 57. Polymer melt 61 collects at the bottom of devolatilizer 57 and is pumped through line 67 by polymer gear pump 65 to a cooling and pelletizing zone.

Slurry from the reactor is allowed to enter the reactor-dryer at a rate which preferably gives no appreciable constant liquid phase in the bed. As can be understood by one skilled in the art this rate depends upon the temperature, pressure and sweep rate in the reactor-dryer as well as its physical size.

The slurry medium can be any inert liquid normally used in slurry polymerizations or the liquid monomer used in a bulk polymerization.

The reactor-dryer has one or more sections, preferably two or more sections which are separated by baffles which can be of various types. Weirs, if used, can be attached to the drive shaft with slip rings or fixed to the walls of the reactor-dryer and are beneficially oriented so that the top of the weir is roughly aligned with the bed orientation during agitation. This provides for spillover along the entire length of the weir top. However, the weirs can be oriented horizontally, if desired. Other types of barriers can be used in place of the weirs to minimize gross back-mixing between the two or more sections of the reactor-dryer. For example, thin wall barriers attached to the drive shaft which fill the reactor cross-section and have one or more holes cut in them can be used as can be understood by one skilled in the art.

The polymer particulate passes through the solids take-off and falls into the take-off vessel. This polymer particulate can then be treated with additives and melt extruded in ways conventional to the art or it can be taken off the reactor-dryer without substantial pressure letdown and melted using the heat of further polymerization and thereafter melt finished.

The polymer solid in reactor-dryer traverses the length of reactor essentially because of polymer build-up in the bed and not by the stirring agitation. This condition is insured by the paddle design used which provides for agitation but for no essentially backward or forward movement of the bed. The recycle rate is preferably adjusted so that the bed is not fluidized adding to the economy of the process. Polymer particulate in the bed adjacent to the take-off barrier is swept by the stirring through the take-off barrier opening, which opening may be made variable in size and position by a number of devices for maintaining different levels of polymer particulate in the reactor-dryer.

The interior of the reactor is equipped with a rotating drive shaft extending longitudinally through the reactor-dryer to which are attached paddles extending transversely from the shaft and beneficially making close clearance with the inside wall of reactor-dryer to insure adequate bed mixing at the reactor wall. The paddles are preferably flat to maximize bed agitation for a given rotational speed and preferably two paddles per impellor are used. Other shapes and numbers of paddles per impellor can be used. The width of the paddles is such that between about two and about twelve impellors (4 to 24 paddles) will be present in a reactor-dryer section of about three feet in length. However, this choice depends upon the size of the reactor-dryer. The paddles are so constructed to minimize any forward or backward movement of the bed during stirring and are driven at such a speed as to give a slow and regular turnover of the entire polymer bed contained in the reactor-dryer. The speed at which the impellors turn should be fast enough to provide the desired heat and mass transfer between liquid, solid and gas but not so fast that the finer portions of the polymer bed are thrown up in large quantities into the space above the bed. That is, the speed preferably is about five to about forty RPM so that the integrity of the bed is maintained.

The space following the take-off barrier and above the take-off vessel can be likewise equipped with one or more similar impellors, the number of which depend upon the size of the take-off zone. However, take-off assemblies such as end or side take-off apertures, which assemblies replace the take-off barrier, can be used as can be understood by one skilled in the art.

Temperature and pressure conditions in the reactor-dryer generally depend upon those used in the polymerization reactor. However, the temperature and pressure conditions can be set independently of those used in the reactor depending upon the type of polymerization used, monomer employed, etc. In general, the temperature range used in the reactor-dryer varies between about 40° C. up to about the softening temperature of the bed.

The total reactor-dryer pressure is composed of the polymerizable monomer pressure, vaporized slurry medium pressure and hydrogen, if used, pressure and such total pressure typically may vary from above about atmospheric to about 600 psig. The individual partial pressures of the components making up the total pressure determine the rate at which polymerization occurs in the reactor-dryer and in part the molecular weight and the molecular weight distribution of the final product.

Preferably, between about five and about fifty percent of the overall amount of polymerization is accomplished in the reactor-dryer and, more preferably, it runs between about ten and about thirty percent.

If desired, a second monomer or a mixture of monomers can be employed in the reactor-dryer thereby producing copolymer product. The reactor-dryer recycle is then more complicated as can be understood by one skilled in the art.

Operation of the melter and subsequent finishing operations if melt finishing is used rather than conventional finishing, e.g. extruders, are those taught in U.S. Pat. No. 3,970,611, the subject matter of which is by reference incorporated herein.

The processes described herein can be applied to the drying and finishing of polymerizable monomers which are polymerizable below the softening point of their polymeric forms including ethylene, propylene, 4-methyl-pentene-1, butene-1, vinyl chloride, butadienes, styrene and mixtures of such monomers. Particularly suitable are ethylene, propylene, their mixtures and mixtures of ethylene or propylene with at least one of the other monomers set forth above.

In general, the catalysts which are most useful to the processes described herein are those which are very active and give a high yield on catalyst. Included in this group are cocatalysts composed of organo-metallic compounds of Periodic Groups IA, IIA, and IIIA and catalysts which are based on transition metal compounds. Aluminum alkyl compound cocatalysts are especially preferred and may be trialkylaluminum or an alkyl aluminum halide such as a dialkylaluminum chloride. The transition metal catalyst can be a metal compound of Group IV or Group V such as a titanium or vanadium compound, a compound of Group VI such as chromium or molybdenum oxide or may be one of the above catalysts supported on a magnesium-based support or a support such as alumina, silica, or silica-alumina.

The preferred catalysts and cocatalysts are as aforesaid high yield catalysts. By high yield is meant catalysts and cocatalysts the residues of which do not have to be removed from the products of the process.

The preferred catalysts and cocatalysts for ethylene polymerization are a tri-alkylaluminum cocatalyst with a catalyst which is a titanium compound supported on magnesium-based support or chromium oxide supported on alumina, silica or combinations thereof. For propylene polymerization it is preferable to use a dialkylaluminum chloride cocatalyst and a catalyst which is a titanium trichloride. However, the process and apparatus described herein are not meant to be limited to the catalyst and cocatalyst used except in that the processes operate best using high yield catalyst systems which retain substantially their activity until deliberately killed.

While the invention is described in connection with the specific Examples below, it is to be understood that these are for illustrative purposes only. Many alternatives, modifications, and variations will be apparent to those skilled in the art and such alternatives, modifications and variations fall within the spirit and scope of the appended claims.

EXAMPLE I

A 30 weight percent slurry of ethylene in isobutane is removed from a slurry loop reactor operating using $Et_3Al$ and a magnesium-compound-supported, titanium-containing catalyst. The slurry is continuously transferred without concentration directly into a 6 ft. by 24 ft., two section, carbon steel reactor-dryer. The reactor-dryer is equipped with a gear driven drive shaft to which are attached thirty-six adjacent, two-paddle impellors. The two sections of the reactor-dryer are separated by a rotating steel disk barrier which has two impellors attached to it, one on either side, and contains two holes cut so that polymer particulate can pass in either direction with equal ease but particulate agglomerates pass only in the direction of solids take-off where they are periodically removed as is taught in U.S. Pat. Application No. 675,734. Each section contains an off-gas outlet and a vapor recycle inlet. The reactor-dryer is operated at a temperature of about 115° C. and a pressure of about 400 psig.

About 18,000 lbs. per hour of polymer associated with 42,000 lbs. per hour of isobutane (30 weight percent slurry) is fed to the reactor-dryer. The still active catalyst present polymerizes ethylene, added via the slurry and present in the reactor-dryer from the gas recycle, at a rate of about 5,000 lbs. per hour. Approximately 49,000 lbs. per hour of recycle gas which is a mixture of ethylene, hydrogen and isobutane vapor enters the reactor-dryer through the recycle inlets per hour. This gas is a combination of make-up ethylene and recycle gas which is produced by removing isobutane vapor in a separation zone, which isobutane is recycled to the loop reactor. The average residence time of polymer particulate in the reactor-dryer is about 0.35 hours.

The substantially dried particulate and some vapors are removed from the reactor-dryer by passing through a hole cut in a disk barrier placed at one end and fall vertically through the reactor without substantial pressure letdown into a carbon steel, 12 ft. × 8 ft. melter equipped with a heating coil where about 2,000 lbs./hr. additional polymerization take place in an essentially adiabatic manner. A combination of polymerization heat and externally added heat from the coil melt the particulate to a polymer melt of suitable temperature for easy transfer. About 25,000 lbs./hr. of molten polymer is pumped out of the melter at about 200° C. using a polymer gear pump. The catalyst in the melt is killed with water, stabilizers added, the melt passed through a devolatilizer and then pumped out of the devolatilizer, cooled and chopped into pellets.

Some properties of the polyethylene product produced are as follows: density of 0.960, melt index of 5, tensile modulus of 160,000 lbs.

EXAMPLE II

The procedure used in this Example is the same as for Example I except that the reactor slurry is first passed through a hydroclone to concentrate the reactor slurry to about 50 weight percent. Isobutane from the hydroclone is recycled to the reactor. This concentrated slurry (about 18,000 lbs./hr. of polyethylene and about 18,000 lbs./hr. of isobutane) is fed to a 4 ft. × 20 ft. reactor-dryer. An approximately 2,150 lbs./hr. amount of polymer is formed by polymerization in the reactor-dryer using 21,000 lbs./hr. of recycle gas. Residence time is about 0.2 hours. The melter produces about 1,750 lbs./hr. of polymer by further polymerization and 21,900 lbs./hr. of molten polymer exits the melter to finishing.

Properties of the polyethylene product are substantially the same as those set forth in Example I.

EXAMPLE III

The process of Example I is repeated except that propylene is polymerized in a slurry process using Et$_2$AlCl and activated TiCl$_3$ in a conventional slurry reactor. A 30 weight percent slurry of polypropylene in hexane from the reactor (18,000 lbs./hr. of polypropylene and 42,000 lbs./hr. of hexane) is fed directly to the 6 ft. × 27 ft. reactor-dryer operating at 70° C. and 250 psig. An approximately 5,600 lbs./hr. amount of polypropylene is formed by additional polymerization in the reactor-dryer which has about 20,000 lbs./hr. of recycle gas (essentially propylene) entering. The average residence time of particulate in the reactor dryer is about 0.4 hours.

The melter is operated to make about 2,050 lbs./hr. of additional polypropylene. A 25,650 lbs./hr. amount of molten polypropylene at about 200° C. is pumped out of the melter by a polymer gear pump to finishing.

Properties of the polypropylene product are: density of 0.915, melt flow rate of 4 and tensile modulus of 230,000 lbs.

EXAMPLE IV

The process of Example III is followed except that a hydroclone is used to give about a 50 weight percent slurry to be fed to the reactor-dryer. An approximately 18,000 lbs./hr. amount of polypropylene and about an 18,000 lbs./hr. amount of hexane are fed to the reactor-dryer as a slurry. About a 2,400 lbs./hr. amount of polypropylene is formed by polymerization in the reactor-dryer and about 8,500 lbs./hr. of recycle gas enters the reactor-dryer.

In the melter about 1,775 lbs./hr. of polypropylene is formed by additional polymerization and about 22,175 lbs./hr. of molten polymer is pumped from the melter by the polymer gear pump to finishing.

Properties of the polypropylene product are substantially the same as those set forth in Example III.

What is claimed is:

1. A process for drying polymer slurry containing active polymerization catalyst and produced by polymerization in a slurry or bulk phase polymerization which comprises
   (a) adding said slurry to a stirred drying zone containing solid particulate polymer, wherein the amount of slurry added is small in comparison with the amount of said solid particulate polymer;
   (b) passing a gas stream containing polymerizable monomer into said drying zone;
   (c) carrying out a fraction of the overall amount of polymerization in said drying zone, thereby vaporizing easily vaporizable components in the polymer slurry, in essential part, by polymerization heat; and
   (d) removing said vaporized components from said drying zone in said gas stream.

2. A process for treating polymer slurry containing active polymerization catalyst and produced by polymerization in a slurry of bulk phase polymerization reactor which comprises
   (a) adding said slurry to a stirred drying zone containing solid particulate polymer, wherein the amount of slurry added is small in comparison with the amount of said solid particulate polymer;
   (b) passing a gas stream containing polymerizable monomer into said drying zone;
   (c) carrying out a fraction of the overall amount of polymerization in said drying zone, thereby vaporizing easily vaporizable components in the polymer slurry, in essential part, by polymerization heat, and forming substantially dry particulate polymer;
   (d) removing said vaporized components from said drying zone in said gas stream;
   (e) leading the substantially dry particulate polymer from said drying zone to a melting zone; and
   (f) carrying out a fraction of the overall amount of polymerization in said melting zone thereby melting said substantially dry particulate polymer, in substantial part, by polymerization heat, and forming an easily transferable melt.

3. The process of claim 1 wherein said slurry is substantially concentrated prior to addition to said drying zone.

4. The process of claim 2 wherein said slurry is substantially concentrated prior to addition to said drying zone.

5. The process of claim 1 wherein said drying zone comprises:
   (a) a horizontal reactor-dryer of substantially circular cross-section containing a centrally-located drive shaft extending longitudinally through said reactor-dryer to which are attached a plurality of adjacently located paddles, which paddles cause essentially no forward or backward movement of the particulate matter contained in said reactor-dryer and extend transversely within and to a short distance from the internal surfaces of said reactor-dryer, said reactor-dryer having one or more polymerization-drying sections divided by the necessary number of barriers so constructed to allow free gas mixing in said reactor-dryer and to control movement of said particulate matter between said sections;
   (b) driving means for said drive shaft;
   (c) one or more reactor-dryer off-gas outlets spaced along the topward part of said reactor-dryer;
   (d) one or more vapor recycle inlets spaced along the bottomward part of said reactor-dryer; and
   (e) take-off means for said particulate matter at one end of said reactor-dryer.

6. The process of claim 2 wherein said drying zone comprises:
   (a) a horizontal reactor-dryer of substantially circular cross-section containing a centrally-located drive shaft extending longitudinally through said reactor-dryer to which are attached a plurality of adjacently located paddles, which paddles cause essentially no forward or backward movement of the particulate matter contained in said reactor-dryer and extend transversely within and to a short distance from the internal surfaces of said reactor-dryer, said reactor-dryer having one or more polymerization-drying sections divided by the necessary number of barriers so constructed to allow free gas mixing in said reactor-dryer and to control movement of said particulate matter between said sections;
   (b) driving means for said drive shaft;

(c) one or more reactor-dryer off-gas outlets spaced along the topward part of said reactor-dryer;

(d) one or more vapor recycle inlets spaced along the bottomward part of said reactor-dryer; and (e) take-off means for said particulate matter at one end of said reactor-dryer.

7. The process of claim 3 wherein said drying zone comprises:

(a) a horizontal reactor-dryer of substantially circular cross-section containing a centrally-located drive shaft extending longitudinally through said reactor-dryer to which are attached a plurality of adjacently located paddles, which paddles cause essentially no forward or backward movement of the particulate matter contained in said reactor-dryer and extend transversely within and to a short distance from the internal surfaces of said reactor-dryer, said reactor-dryer having one or more polymerization-drying sections divided by the necessary number of barriers so constructed to allow free gas mixing in said reactor-dryer and to control movement of said particulate matter between said sections;

(b) driving means for said drive shaft;

(c) one or more reactor-dryer off-gas outlets spaced along the topward part of said reactor-dryer;

(d) one or more vapor recycle inlets spaced along the bottomward part of said reactor-dryer; and (e) take-off means for said particulate matter at one end of said reactor-dryer.

8. The process of claim 4 wherein said drying zone comprises:

(a) a horizontal reactor-dryer of substantially circular cross-section containing a centrally-located drive shaft extending longitudinally through said reactor-dryer to which are attached a plurality of adjacently located paddles, which paddles cause essentially no forward or backward movement of the particulate matter contained in said reactor-dryer and extend transversely within and to a short distance from the internal surfaces of said reactor-dryer, said reactor-dryer having one or more polymerization-drying sections divided by the necessary number of barriers so constructed to allow free gas mixing in said reactor-dryer and to control movement of said particulate matter between said sections;

(b) driving means for said drive shaft;

(c) one or more reactor-dryer off-gas outlets spaced along the topward part of said reactor-dryer;

(d) one or more vapor recycle inlets spaced along the bottomward part of said reactor-dryer; and (e) take-off means for said particulate matter at one end of said reactor-dryer.

9. The process of claim 1 wherein said slurry comprises polypropylene, polyethylene or a copolymer thereof and a lower hydrocarbon.

10. The process of claim 2 wherein said slurry comprises polypropylene, polyethylene or a copolymer thereof and a lower hydrocarbon.

11. The process of claim 3 wherein said slurry comprises polypropylene, polyethylene or a copolymer thereof.

12. The process of claim 4 wherein said slurry comprises polypropylene, polyethylene or a copolymer thereof.

13. The process of claim 5 wherein said slurry comprises polypropylene, polyethylene or a copolymer thereof.

14. The process of claim 6 wherein said slurry comprises polypropylene, polyethylene or a copolymer thereof.

15. The process of claim 7 wherein. said slurry comprises polypropylene, polyethylene or a copolymer thereof.

16. The process of claim 8 wherein said slurry comprises polypropylene, polyethylene or a copolymer thereof.

17. The process of claim 16 in which said melt is treated with catalyst kill agent, stabilized, devolatilized and cooled to a commercially usable solid form.

* * * * *

UNITED STATES PATENT OFFICE
CERTIFICATE OF CORRECTION

Patent No. 4,099,335      Dated July 11, 1978

Inventor(s) James L. Jezl and Edwin F. Peters

It is certified that error appears in the above-identified patent and that said Letters Patent are hereby corrected as shown below:

Patent
Column    Line

First Page    Under Attorney, Agent, or Firm, "Stanely L. Hensley" should read -- Stephen L. Hensley --

1    30    "substantially" should read -- substantial --

7    10-11    "Et-$_2$" should read -- Et$_2$- --

7    67    "of" should read -- or --

Signed and Sealed this

Twentieth Day of November 1979

[SEAL]

Attest:

RUTH C. MASON
Attesting Officer

LUTRELLE F. PARKER
Acting Commissioner of Patents and Trademarks